April 1, 1952     C. HETTINGER     2,591,546
MACHINE FOR MAKING COFFEE RINGS
Filed July 18, 1946
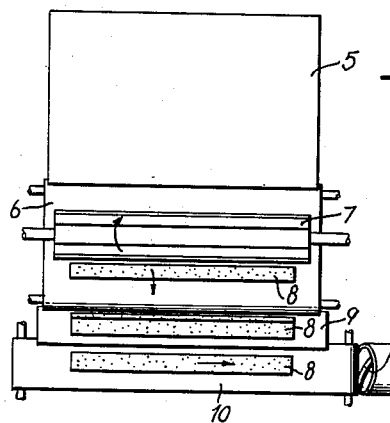
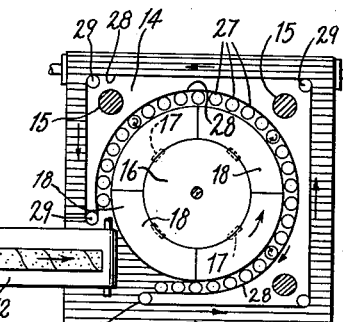
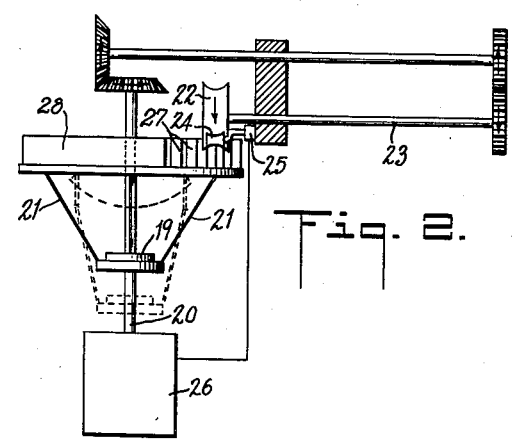
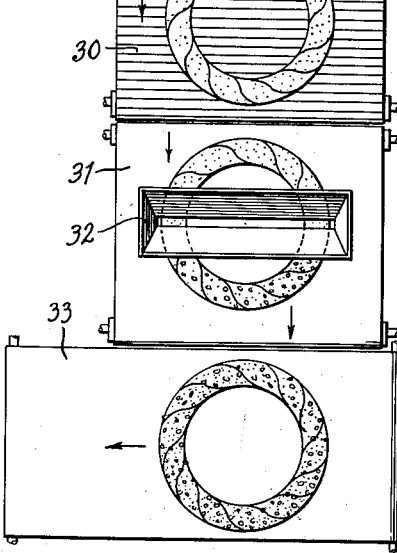
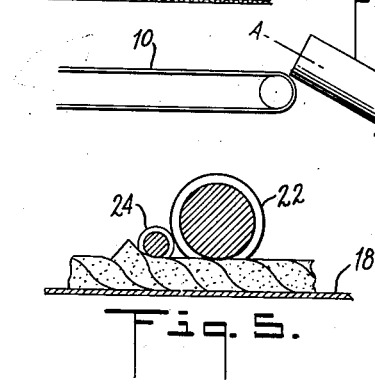
INVENTOR.
CHARLES HETTINGER
BY
Johns & Roe
ATTORNEYS Patented Apr. 1, 1952

2,591,546

UNITED STATES PATENT OFFICE 2,591,546

MACHINE FOR MAKING COFFEE RINGS

Charles Hettinger, West Englewood, N. J.

Application July 18, 1946, Serial No. 684,409

9 Claims. (Cl. 107—8)

My invention comprehends a machine for automatically manufacturing coffee rings. It involves dough-strip forming mechanism in conjunction with means for imparting an appropriate twist to the strip, and a moulding device which forms the twisted strip into an annular configuration and ultimately deposits it on a conveyor from which it may be transferred to another conveyor where it is embellished with nuts or other tasty morsels, preparatory to baking.

Of special importance are (1) the dough-strip twisting medium, which incorporates a rotary inclined cylinder with internal deflections adapted, with the rotary movement of the cylinder, to produce the desired twisting effect—it being understood that the speed of rotation of the cylinder is regulatable to insure short or long twists of the strip; (2), the dough moulding apparatus wherein the twisted strip upon delivery thereto is rotated against a circular row of closely arranged rotary spools to knead it into the form of a ring, and with the aid of a unique cooperative attachment join and compress the ends of the strip; and (3); the novel adaptation of the trap door principle, wherein the ring, as a complete entity, is deposited automatically upon a conveyor, in readiness for any subsequent treatment which the occasion may require.

In the drawings:

Fig. 1 is a top plan view of the machine embodying my invention.

Fig. 2 is a side elevation of the moulding apparatus removed.

Fig. 3 is a side elevation of the twisting cylinder and the delivery and receiving conveyors associated therewith.

Fig. 4 is a diagrammatic fragmentary view of the inside of the cylinder taken along lines A—A of Fig. 3, and, Fig. 5 is a detail view illustrating the manner of joining the ends of the dough strip to produce a ring.

Specifically, 5 designates a dough sheeter, beneath which is a relatively wide conveyor belt 6. Disposed in juxtaposition to belt 6 is a rotary cutter 7 designed to sever the dough sheet into longitudinal strips, as 8, which are fed by said belt onto ramp 9, and from this point the strips are passed to a second conveyor belt 10, arranged at right angles to the first mentioned belt 6. The discharge end of belt 10 lies contiguous the upper open end of an inclined cylinder 11, (Fig. 3), while the lower end of the latter terminates just above a horizontal conveyor 12. As shown diagrammatically in Fig. 4, the inside wall of the cylinder is equipped with suitably spaced spiral ribs, flutes or similar deflections 13.

The ring-forming apparatus comprises the following structual components. Below the delivery end of the conveyor 12 is a table 14 depending from uprights 15. Medially of the table is a circular rotary platform 16, to the periphery of which are hinged, as at 17, arcuate trap doors 18. With particular reference to Fig. 2, it will be noted that the bottom of each door is connected to a collar 19, carried by vertical shaft 20, through the medium of a rod 21. A grooved joining roller 22 is mounted on the inner terminal of shaft 23 and is designed to operate in the path of rotation of the trap doors. And in conjunction with roller 22, there is provided an idler 24 and a switch 25 for actuating solenoid 26 at the bottom of shaft 20. The outer edges of the trap doors are rimmed by a circular series of vertical spools 27 disposed in close proximity to each other, and frictionally engaged, and maintained under constant rotation, by belt 28, trained over pulleys 29. As will be observed in Fig. 1 of the drawings, the row of spools or rollers does not constitute a complete circle, but has a gap therein to provide for the introduction of the adjacent end of conveyor 12. Moreover, as indicated by the arrows in Fig. 1, the platform and spools rotate in opposite directions.

As an adjunct to the finishing off stages, a plurality of conveyors may be used to advantage. One is exhibited at 30—located beneath platform 16 and preferably made of wire; a second one, 31, is substantially a continuation of the former with a nut-hopper 32 above, and the third, 33, lies at right angles to conveyor 31.

In the foregoing description, specific reference to gearing, driving power, etc., have been omitted, because they are obvious and conventional in character.

After dough, of desirable thickness, is emitted from sheeter 5, it is cut into strips 8 of proper dimensions by rotary cutter 7, from whence it traverses down ramp 9, onto conveyor 10 and into cylinder 11, which has been previously regulated to impart the desired twist, i. e., to increase the number of twists in the dough piece there should be an increment of the R. P. M. of the cylinder, and vice versa, to restrict the number of twists, a reduction of the R. P. M. of the cylinder will suffice. Appropriately twisted, the dough-piece emerges from the cylinder and is transferred to the top of trap doors 18 carried by rotary platform 16, where it is rounded out by the action of spools 27. As the forward end of dough-strip completes its circular movement, it overlaps slightly at its opposite ends—as illustrated in Fig. 5. Roller 22 compresses the overlapping terminals to a single thickness and thereby forms a complete ring 34, then idler 24 trips switch 25 and actuates solenoid 26. Immediately trap doors 18 open—see position thereof in dotted lines, Fig. 2—and ring is deposited on conveyor 30. The ring may then be sprayed with an egg wash preparatory to depositing nuts or the like, thereon from hopper 32, following which the complete product is transferred to an oven by conveyor 33.

I claim:

1. A machine of the class described, comprising, in combination, a rotating circular platform designed to sustain a dough-strip, a substantially circular row of kneading rollers surrounding the platform, the rollers being rotatable on vertical axes in a direction opposite to the rotation of the platform, and having their peripheries in vertical alignment with the outer edge of the platform.

2. A machine of the class described, comprising, in combination, a rotating circular platform designed to sustain a dough-strip, a substantially circular row of kneading rollers surrounding the platform, the rollers being rotatable on vertical axes in a direction opposite to the rotation of the platform and having their peripheries in vertical alignment with the outer edge of the platform, and a roller mounted over said platform having its axis parallel to the working surface and radially disposed with respect to the center of the platform adjacent the inner side of the row of kneading rollers for compressing together the overlapping ends of the strip to present a circular form.

3. A machine of the class described, comprising, in combination, a rotating circular platform designed to sustain a dough-strip, a substantially circular row of kneading rollers surrounding the platform, the rollers being rotatable on vertical axes in the direction opposite to the rotation of the platform and having their peripheries in vertical alignment with the outer edge of the platform, a roller mounted over said platform having its axis parallel to the working surface and radially disposed with respect to the center of the platform adjacent the inner side of the row of kneading rollers for compressing together the overlapping ends of the strip to present a circular form, and means for ejecting the form from the platform.

4. A machine of the class described, comprising, in combination, a rotating circular platform designed to sustain a dough-strip, a substantially circular row of kneading rollers surrounding the platform, the rollers being rotatable on vertical axes in a direction opposite to the rotation of the platform and having their peripheries in vertical alignment with the outer edge of the platform, a conveyor beneath the platform, the latter having a releasable bottom, and means for actuating the bottom to eject the dough onto the conveyor.

5. A machine of the class described, comprising in combination with means for twisting, kneading and forming a dough-strip into a ring, of a rotary circular platform having a trap-door at its outer edge, a conveyor beneath the platform, and means for releasing the trap-door and depositing the ring on the conveyor.

6. A machine of the class described, comprising in combination with means for twisting, kneading and forming a dough-strip into a ring, of a rotary circular platform having a plurality of arcuate trap-doors at its outer edge, a shaft depending from the platform, a collar splined to the shaft, connections between the trap-doors and the collar, a solenoid mounted on the end of the shaft, a conveyor beneath the platform, and means for actuating the solenoid and thereby releasing the trap-doors and depositing the ring on the conveyor.

7. A machine of the class described, comprising in combination a rotating circular platform designed to sustain a dough-strip, a substantially circular row of kneading rollers surrounding the platform and mounted for rotation on vertical axes and a belt engageable with the peripheries of the rollers so as to rotate them simultaneously in a direction opposite to the rotation of the platform.

8. A machine of the class described, comprising in combination a rotating circular platform designed to sustain a dough-strip, a substantially circular row of kneading rollers surrounding the platform and mounted for rotation on vertical axes, a series of vertically disposed pulleys, and a belt trained about the pulleys and the peripheries of the rollers for simultaneously rotating the latter.

9. A machine of the class described, comprising in combination a rotating circular platform designed to sustain a dough-strip, a substantially circular row of vertically arranged, rotating kneading rollers surrounding the platform for the major portion of its circumference and thereby leaving a gap between the terminals, a plurality of vertically disposed pulleys, and an endless belt trained over the pulleys and the peripheries of the rollers for simultaneously rotating the latter.

CHARLES HETTINGER.

REFERENCES CITED

The following references are of record in the file of this patent:

UNITED STATES PATENTS

| Number | Name | Date |
|---|---|---|
| Re. 21,425 | Guldbech | Apr. 16, 1940 |
| 381,554 | Humble | Apr. 24, 1888 |
| 557,237 | Scholz et al. | Mar. 31, 1896 |
| 1,126,606 | Wolf | Jan. 26, 1915 |
| 1,274,704 | Garvey | Aug. 6, 1918 |
| 1,552,430 | Gendler | Sept. 8, 1925 |
| 1,663,719 | Morley | Mar. 27, 1928 |
| 1,802,698 | Blanchard | Apr. 28, 1931 |
| 2,119,673 | Gielow | June 7, 1938 |
| 2,207,795 | Grimm | July 16, 1940 |
| 2,259,476 | MacManus | Oct. 21, 1941 |